March 27, 1928.  1,663,580
B. S. ANDERSIN
CONTRIVANCE FOR FASTENING WOODWORK
Filed Dec. 1, 1926   2 Sheets-Sheet 1
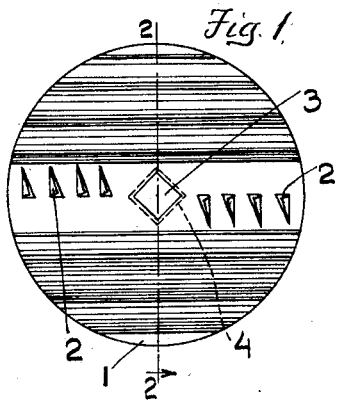
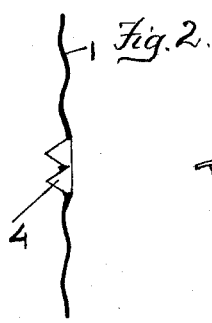
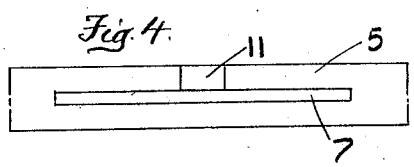
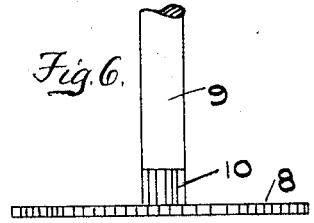
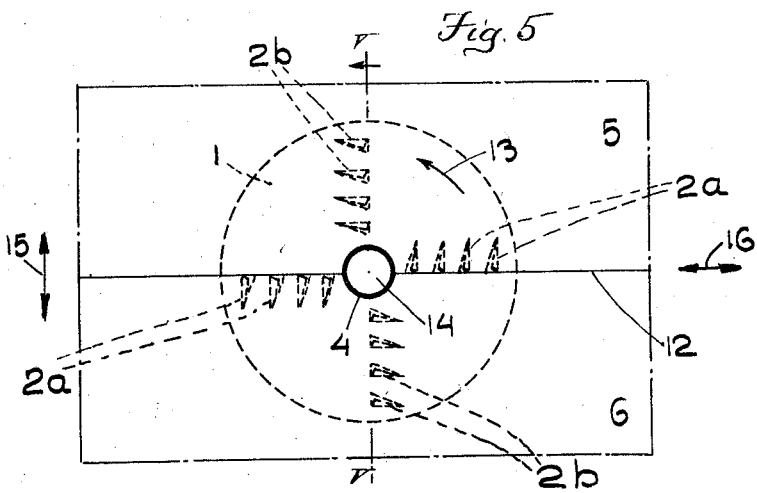
Inventor:
Bruno Severin Andersin March 27, 1928. 1,663,580
B. S. ANDERSIN
CONTRIVANCE FOR FASTENING WOODWORK
Filed Dec. 1, 1926 2 Sheets-Sheet 2
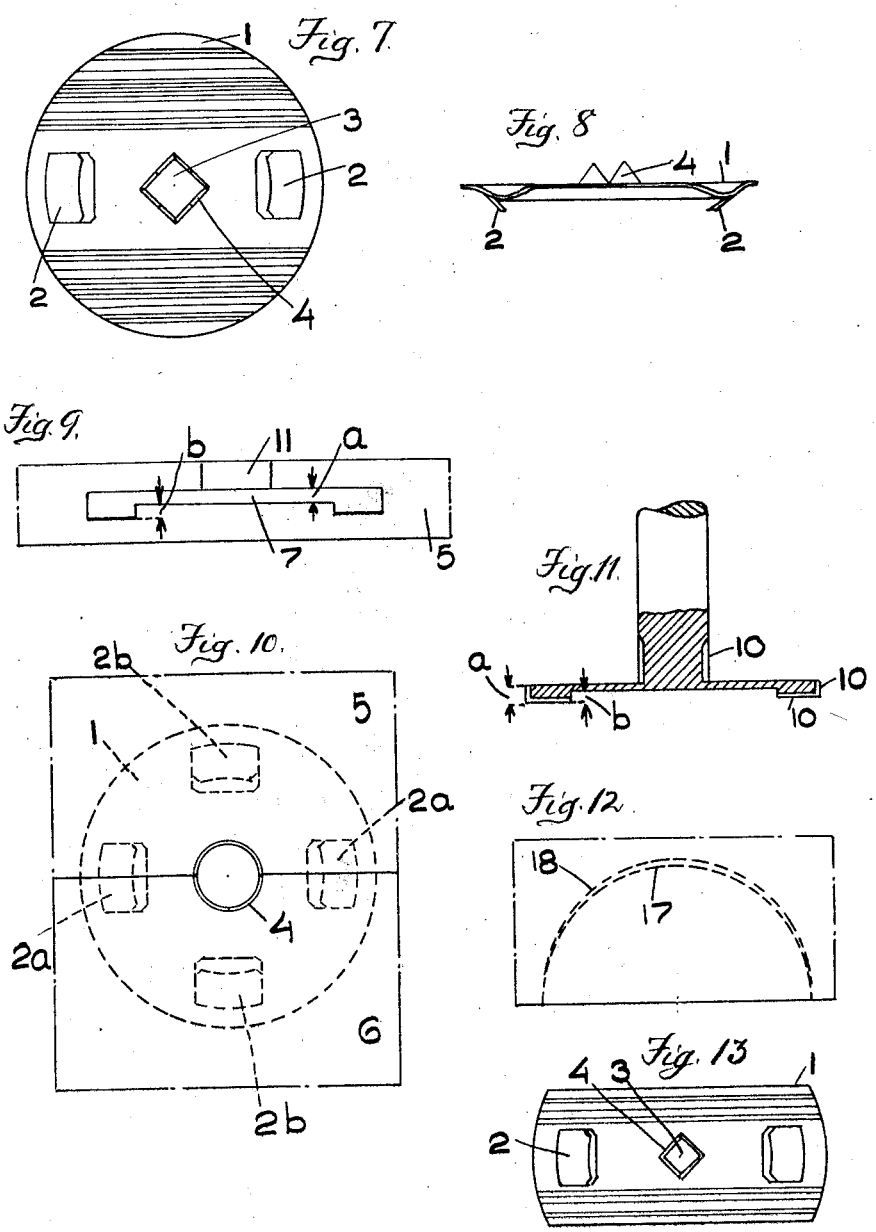

Patented Mar. 27, 1928.

1,663,580

UNITED STATES PATENT OFFICE.

BRUNO SEVERIN ANDERSIN, OF HELSINKI, FINLAND.

CONTRIVANCE FOR FASTENING WOODWORK.

Application filed December 1, 1926, Serial No. 152,044, and in Finland November 12, 1925.

In the fastening of woodwork, for instance, in the manufacture of boxes, where boards are fastened together, the manner of fastening has varied considerably, for instance, dovetailing with or without gluing. These manners of fastening have, however, generally been defective in so far as they do not withstand dampness or can not resist forces acting upon the joints or tending to displace the boards relatively to one another in the direction of the joints. The object of my invention is to produce a fastening that will, as far as possible, resist all forces acting upon the joints, and also will withstand the effect of dampness.

How this problem has been solved by the present invention, will be seen clearly from the following, with reference to the accompanying drawing, in which Fig. 1 is a top plan view of one embodiment of the new fastening means.

Fig. 2 a section along line 2—2 in Fig. 1,

Fig. 3 a side view.

In Fig. 4 is seen the fastening side of one of the pieces of wood to be fastened to another.

Fig. 5 shows two pieces of wood fastened together by the new fastening means.

Fig. 5ª is a cross-section along line V—V in Fig. 5.

Fig. 6 shows a tool required for applying the invention a portion being broken off.

Fig. 7 is a top plan view of a modification.

Fig. 8 is a side view thereof.

Fig. 9 shows the fastening side of the board.

Fig. 10 again shows the finished fastening.

Fig. 11 shows a tool required for fastening, a portion being broken off.

Fig. 12 shows the way of milling the groove in the boards that are to be fastened to one another, while Fig. 13 is a top view of another modification.

According to Figs. 1-3 the fastener consists of a corrugated metal plate, from which have been stamped projecting tongues 2, that can be, for instance, placed diagonally opposite one another, as seen in Fig. 1. The plate is in this case round, and from its centre a polygonal hole (for instance square) 3, with its projecting edge tongues 4 has been stamped out.

Now, for the fastening together of two pieces of wood 5 and 6, a semi-circular groove 7 is first of all milled in both which groove corresponds in size to the diameter of the fastener. For this purpose a tool of the kind illustrated in Fig. 6 is used, having a circular bit 8. The part of the shaft 9 that is nearest the bit 8 is provided with milling teeth 10 like the bit 8. When the groove 7 is cut, the teeth on the shaft 9 also cut a semi-circular opening 11. When the groove 7 has been milled in both pieces, the fastener 1 is fitted into the grooves, and the edges of the boards are then pressed together. The fastener is now in such a position in relation to the joint 12, that the projecting tongues 2 assume the position 2ª (Fig. 5). Now a suitable key is inserted into the hole 3, and the fastener thereby is turned, for instance, in the direction of the arrow 13 (Fig. 5) about an angle of about 90°, so that the tongues come to the position 2ᵇ. Thereupon the edge tongues 4 of the hole 3 are pressed, by means of a suitable tool, against the edges of the circular hole 14 formed by the semicircular openings 11. The edge tongues 4 can, if desired, be so long, that they can be bent over the outer surface of the wooden pieces. Thus the fastening is completed. As the fastener 1 is turned, the tongues 2 will bite into the wood, for the groove 7 is namely so shallow, that the tongues 2 are forced into the wood, as the fastener is turned. Such a fastening capable of resisting bending, by reason of the fastener being made of corrugated plate. Also the tongues 2 guarantee resistance against tension in the direction of the double arrow 15, as well as a certain resistance against the displacement of the pieces 5 and 6 in the direction of the double arrow 16. The edge tongues 4 likewise resist the latter displacement.

The fastener 1 shown in Figs. 7–12 also consists of a round corrugated metal plate, and there are also diagonally placed tongues 2, but in this embodiment the tongues are less in number, for instance one tongue being sufficient for each of the pieces to be joined. For the use of this fastener, a groove is milled out from the wooden pieces 5' and 6', shown in Fig. 9. For this purpose the tool illustrated in Fig. 11 is used. The teeth of the cutter are indicated at 10'. With this tool, a semi-circular groove is milled out, equal to the thickness $a$ of the tool, whereupon the tool is pressed down a distance equal to $b$, whereby a groove 7' of the desired shape is obtained. The fastener is then placed between the two pieces 5 and 6 in such a manner that the tongues are in the position $2^{a'}$ (Fig. 10). Then the fastener is turned in either direction to bring the tongues to the position $2^{b'}$. The tongues will not cut into the wood, but move in the roomier peripheral part of the groove 7'. This may be an advantage, when using harder woods.

In the latter form the fastening will be still better if, during the milling of the groove 7', the tool illustrated in Fig. 11 is pressed into both pieces of wood, or only one of them, so deep that the groove 7' becomes somewhat deeper than the semi-circular shape indicates, and if for instance the curve 17 in Fig. 12 equals the semi-circle, the cutter is pressed in so far that the curve 18 gives the boundary of the milled groove 7', and only then the roomier peripheral part of the groove 7' is milled out. As the fastener is turned, the tongues 2 are pressed against the knee formed by the roomier peripheral part of the groove 7 and its narrower middle part, whereby a tight fastening is obtained.

In the fastener illustrated in Figs. 7–12, such long tongues 2' can be used, if desired, that as the fastener is turned they, will all cut into the wood, irrespective of the roomier peripheral part of the groove 7.

The fastener need of course not be round, it can be rectangular, square, a polygon, etc., even though the grooves are milled to a semi-circular shape. Also, the groove 7' in both pieces of wood intended to be fastened together need not necessarily be semi-circular even if a round fastener be used. In Fig. 13 is shown a fastener that is not round.

Furthermore, the hole 3 need not necessarily be in the middle of the fastener, because if, for instance, one of the pieces of wood to be fastened together is very narrow, so that there is no room for a deep groove 7, or if for some other reason the fastener shall not go equally deep into the two pieces of wood such a fastener can be used, in which the hole is not in the middle but more to one side of the fastener. The fastener can be made of metal or any other suitable material adapted for wood fastenings. Instead of the shape of the groove 7 shown in Fig. 9 the groove can be enlarged stepwise towards the circumference, to produce additional shoulders. In this case, fasteners with additional pairs of tongues can be used.

The opening at the fastening place can be filled in, if so desired, in any suitable manner.

I claim:

1. A fastener for fastening together two pieces of wood comprising a substantially flat member adapted to be inserted into a groove cut into the joining faces of the pieces of wood to be fastened together, and having tongues projecting from the plane of said member and adapted to bite into the wood upon a turning of said member in said groove.

2. A fastener of the type described, comprising a substantially flat member adapted to be inserted into a groove provided in the parts to be joined, and having tongues projecting from the plane of said member, and an angular hole for the insertion therein of a tool to turn said member in said groove.

3. A fastener of the type described, comprising a substantially flat member adapted to be inserted into a groove provided in the parts to be joined, and having opposed edged tongues projecting from the plane of said member, and adapted to engage the material of the parts to be fastened together.

4. A fastener of the type described, comprising a corrugated member adapted to be inserted into a groove provided in the parts to be joined and having tongues projecting from the plane of said member adapted to cut into the wooden parts to be joined upon a turn of said member.

5. The fastener as specified in claim 4, comprising a polygonal hole having edged tongues projecting therefrom at substantially right angles to the plane of said member.

6. A fastener for fastening together wooden parts comprising a substantially flat member adapted to be inserted into a groove cut into the joining faces of the wooden parts and having a shoulder, tongues projecting from the plane of said member opposite to each other and adapted to bear against the shoulder in said groove upon said member being turned therein.

In testimony whereof I affix my signature.

BRUNO SEVERIN ANDERSIN.